United States Patent
Asjadi

(10) Patent No.: US 8,446,970 B2
(45) Date of Patent: May 21, 2013

(54) DATA PROCESSING APPARATUS AND METHOD

(75) Inventor: Gholam Hosein Asjadi, Guildford (GB)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 12/783,245

(22) Filed: May 19, 2010

(65) Prior Publication Data

US 2010/0310022 A1 Dec. 9, 2010

(30) Foreign Application Priority Data

Jun. 3, 2009 (GB) .................................. 0909583.7

(51) Int. Cl.
*H04K 1/10* (2006.01)
*H04L 27/28* (2006.01)

(52) U.S. Cl.
USPC ............ 375/260; 375/343; 370/203; 370/210

(58) Field of Classification Search
USPC ........... 375/260, 267, 299, 343; 370/203–211
See application file for complete search history.

(56) References Cited

U.S. PATENT DOCUMENTS

| | | | | |
|---|---|---|---|---|
| 2003/0058953 | A1* | 3/2003 | Lee et al. | 375/260 |
| 2009/0067515 | A1* | 3/2009 | Galperin et al. | 375/260 |
| 2009/0103651 | A1* | 4/2009 | Lahtonen et al. | 375/308 |

FOREIGN PATENT DOCUMENTS

| | | |
|---|---|---|
| GB | 2 441 886 A | 3/2008 |
| WO | WO 02/09383 A1 | 1/2002 |
| WO | WO 2007/078095 A1 | 7/2007 |
| WO | WO 2007/124379 A2 | 11/2007 |
| WO | WO 2007/124379 A3 | 11/2007 |

OTHER PUBLICATIONS

U.S. Appl. No. 12/710,567, filed Feb. 23, 2010, Asjadi.
U.S. Appl. No. 12/790,200, filed May 28, 2010, Asjadi.

* cited by examiner

*Primary Examiner* — Curtis Odom
(74) *Attorney, Agent, or Firm* — Oblon, Spivak, McClelland, Maier & Neustadt, L.L.P.

(57) ABSTRACT

A receiver detects and recovers data from Orthogonal Frequency Division Multiplexed (OFDM) symbols. The receiver includes a correlator operable to correlate the time domain samples at a separation determined in accordance with the useful samples of the OFDM symbols and for each of a plurality of possible guard intervals combining the correlated samples for a period equal to the guard interval, for a plurality of consecutively received OFDM symbols, to form for each of the possible guard intervals a correlation output value, and a guard interval identifier arranged to receive the output from the correlator and to identify one of the guard intervals used for the received OFDM symbols from the correlation output value for each of the plurality of possible guard intervals.

15 Claims, 11 Drawing Sheets

Pictorial Description of Blind Guard Detection
Operation shown: when 'Assumed TS' does not equal 'Actual TS'

Pictorial Description of Blind Guard Detection
Operation shown: when 'Assumed TS' equals 'Actual TS'

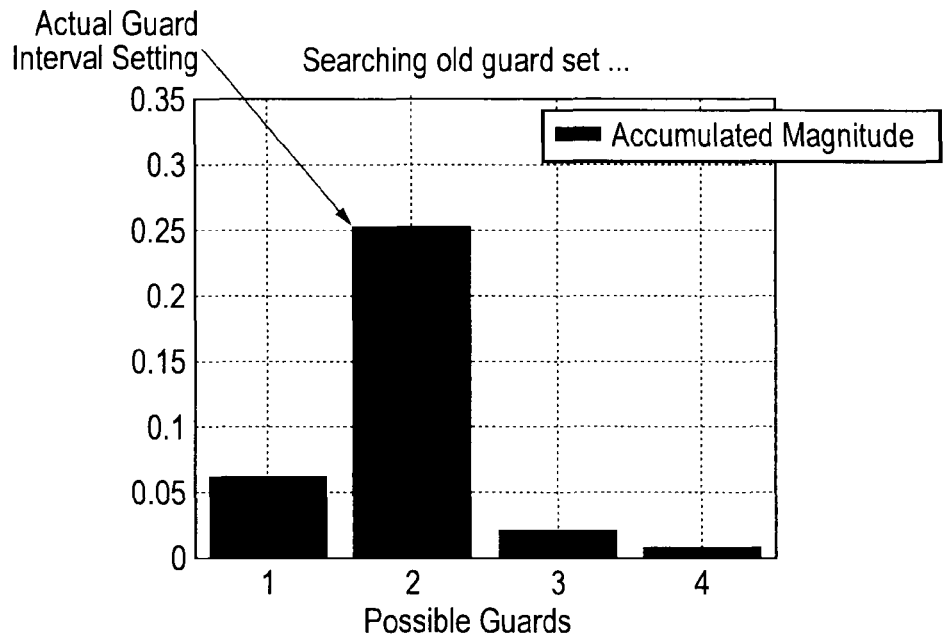
'Accumulated Correlation Magnitudes' for Possible Guard Intervals
FIG. 9
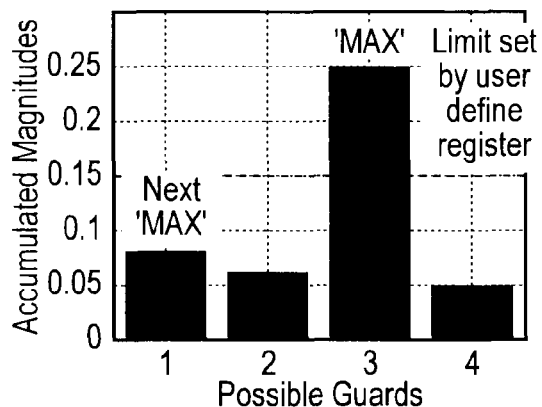 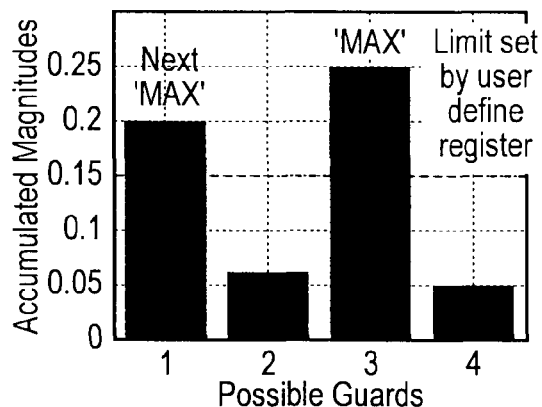
'Accumulated Correlation Magnitudes' for Possible Guard Intervals
Case(a): 'Next Max' falls below limit set → No extended correlation required
Case(b): 'Next Max' exceeds limit set → correlation continues for one more symbol
FIG. 10a          FIG. 10b Operation of Simplified Architecture at Second Symbol Optimum and Allowed Range for Start of Blind GID

DATA PROCESSING APPARATUS AND METHOD

FIELD OF INVENTION

The present invention relates to receivers and methods for detecting and recovering data from Orthogonal Frequency Division Multiplexed (OFDM) symbols, the OFDM symbols including a plurality of sub-carrier symbols, the OFDM symbols being transmitted with a guard interval.

BACKGROUND OF THE INVENTION

There are many examples of radio communications systems in which data is communicated using Orthogonal Frequency Division Multiplexing (OFDM). Systems which have been arranged to operate in accordance with Digital Video Broadcasting (DVB) standards for example, utilise OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of a channel via which the data is to be communicated. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

In order to allow data to be recovered from the OFDM symbols in the presence of multi-path which causes the same OFDM symbols to be received via echo paths and/or simulcast in which the same OFDM symbols are received from more than one transmitter, it is conventional to include a time domain guard interval between successive OFDM symbols. The guard interval is formed by repeating samples in the time domain from a 'useful' part of the OFDM symbols. The useful part of the OFDM symbols correspond to the samples in the time domain which are formed when the modulated sub-carriers are transformed into the time domain from the frequency domain. As a result of the guard interval, all of the samples from the useful part of the OFDM symbols can be received by a receiver provided that the multi-path or the simulcast delay between versions of the same OFDM symbols does not exceed the guard interval.

However, detecting and recovering data from the useful part of the OFDM symbols at the receiver can nevertheless present a technical problem.

SUMMARY OF INVENTION

According to the present invention there is provided a receiver for detecting and recovering data from Orthogonal Frequency Division Multiplexed (OFDM) symbols, the OFDM symbols including a plurality of sub-carrier symbols formed in the frequency domain and transformed into the time domain for transmission, the time domain OFDM symbols including a guard interval. The guard interval of the OFDM symbols is one of a plurality of predetermined temporal lengths and the guard interval is formed by repeating time domain samples of the OFDM symbol for a period corresponding to the guard interval from the OFDM symbol. The receiver includes a demodulator arranged in operation to detect a signal representing the OFDM symbols, and to generate a sampled version of the OFDM symbols in the time domain, a guard detector, which is arranged in operation to identify from the time domain samples of the OFDM symbols, useful samples of the OFDM symbols, a Fourier transform processor arranged in operation to receive the time domain version of the OFDM symbols and to perform a Fourier transform on the useful samples of the OFDM symbols to form a frequency domain version of the OFDM symbols, from which the data symbol bearing sub-carriers can be recovered. A detector is arranged in operation to recover the data from the data bearing sub-carriers of the OFDM symbols. The guard detector includes a correlator arranged to correlate the time domain samples at a separation determined in accordance with the useful samples of the OFDM symbols (Tu) and for each of the plurality of possible guard intervals (Tg) to combine the correlated samples for a period equal to the guard interval, for a plurality of consecutively received OFDM symbols, to form a correlation output value for each guard interval, and a guard interval identifier arranged to receive the output from the correlator and to identify one of the guard intervals used for the received OFDM symbols from the output correlation value for each of the plurality of possible guard intervals.

In some systems, which convey data using OFDM symbols, a plurality of different guard intervals are used in the transmitted OFDM symbols. For example in the DVB-T2 system there are at least seven possible guard intervals. In some circumstances it may be advantageous to detect the guard interval from the received OFDM symbols themselves. Performing a correlation of samples separated by a period of time corresponding to the useful part of the OFDM symbols, and combining the correlated samples by forming an average value of the correlated samples within a moving window equal to a temporal length of the guard interval, a correlation output value can be formed, which depends on the length of the guard interval. By forming such a correlation output value for all possible guard intervals, an estimate can be made of the guard interval from a highest averaged value of the correlated samples produced by a moving averaging filter for a plurality of consecutive OFDM symbols. Since the correlation output value is formed from consecutive symbols, a correct one of the possible guard intervals corresponding to the actual guard interval will reinforce the correlation output value, whereas an incorrect one of the possible guard interval values will reduce the correlation output value when the moving average is applied over consecutive symbols, because non-guard interval samples will appear noise like. As such, an efficient and robust technique can be formed for detecting the guard interval.

In one example, the correlator includes a multiplier operable to multiply signal samples separated by the useful number of samples in the OFDM symbols one of which is conjugated, and a moving averaging filter for each of the possible guard intervals which forms an average of the samples at an output of the multiplier, within a sliding window of samples. The number of samples averaged by the moving average filter is equal to the corresponding guard interval, the guard interval identifier being arranged to identify the guard interval from the moving averaging filter output having a greatest value after the consecutive number of symbols has been received. In combination, the multiplier and the moving averaging filter form a classic correlation sum, each moving averaging filter thereby forming a correlation sum for a guard interval period.

Useful samples of the OFDM symbol correspond to the OFDM symbol samples in the time domain (Tu) before the guard interval (Tg) is applied by repeating samples from the OFDM symbol, which has been generated.

In one example the number of the plurality of consecutively received OFDM symbols is determined in accordance with a minimum time to achieve a reliable detection of the guard interval, for example this may be two or between two and three symbols.

For some examples, the received OFDM symbols may include signalling data indicating the guard interval of the received OFDM symbols, and the detector is operable to recover the signalling data from the OFDM symbols and to provide the guard detector with the indication of the indicated guard interval. The guard interval identifier within the guard detector maybe arranged to estimate the guard interval from a combination of the guard interval indicated by the signalling data and the guard interval identified from a value of the output of the correlator. As such, depending on the time taken to recover the signalling data, compared with the time taken to detect the guard interval from the correlation output value from the correlator, it may take less time to detect the guard interval by decoding the signalling data. For example, the number of samples of the useful part of the OFDM symbols may vary in accordance with a transmitter operating mode between a predetermined number of discrete values. As such the guard interval identifier maybe arranged in some embodiments to determine the guard interval from the output of the correlator or the signalling data depending on whether the signalling data is available before the guard interval can be determined from the output of the correlator. In other examples, both the guard interval detected from the correlation output value and the guard interval determined from the signalling data maybe used to improve an integrity of the estimated guard interval value.

For the example of DVB-T2, for example, the operating modes include 1K, 2K, 4K, 8K, 16K or 32K signal samples, and the guard interval identifier is operable to determine the guard interval from the signalling data, if the operating mode is one of the 16K mode or the 32K mode.

Furthermore in some embodiments, the guard interval identifier may be arranged to determine a fine frequency offset of the OFDM symbols in the frequency domain by determining an argument of the correlation output value for the identified guard interval. The fine frequency offset may be used to adjust a position of the OFDM symbol in the frequency domain to improve a likelihood of correctly detecting the data conveyed by the OFDM symbols.

In some embodiments the OFDM symbols are transmitted in accordance with a Digital Video Broadcasting standard, such as DVB-T, DVB-T2, DVB-H or DVB-C2.

Accordingly in a system such as DVB-T2, where the guard interval is provided in signalling data communicated with the OFDM symbols, the guard interval can be detected without or before the signalling data is detected, thereby reducing a time for detecting the data and/or the guard interval and/or improving an integrity with which the guard interval and therefore the data can be detected.

Various aspects and features of the present invention are defined in the appended claims. Further aspects of the present invention include a method of detecting and recovering data from Orthogonal Frequency Division Multiplexed (OFDM) symbols.

BRIEF DESCRIPTION OF DRAWINGS

Embodiments of the present invention will now be described by way of example only with reference to the accompanying drawings, wherein like parts are provided with corresponding reference numerals, and in which:

FIG. 7b is an example of an output from the correlator for the example shown in FIG. 7a;

FIG. 8b is an illustration of an output of the correlator for the example shown in FIG. 8a;

FIG. 9 is a graphical representation of a result of an output of an accumulated correlation magnitude for four possible guard intervals;

FIG. 10a is a graphical representation of accumulated correlation magnitudes for four possible guard intervals where the next maximum value falls below a threshold limit for detecting a correct guard interval; whereas FIG. 10b provides an example where the next maximum correlation value does not fall below the threshold set to identify the correct guard interval;

FIG. 14b is a graphical representation of a plot of mean phase error and a standard deviation of phase error between a detected fine frequency offset and the actual fine frequency offset for the example of FIG. 14a; FIG. 15b is a graphical representation of a plot of mean phase error and a standard deviation of phase error between a detected fine frequency offset and the actual fine frequency offset for the example of FIG. 15a.

DESCRIPTION OF PREFERRED EMBODIMENTS

Figure 1:
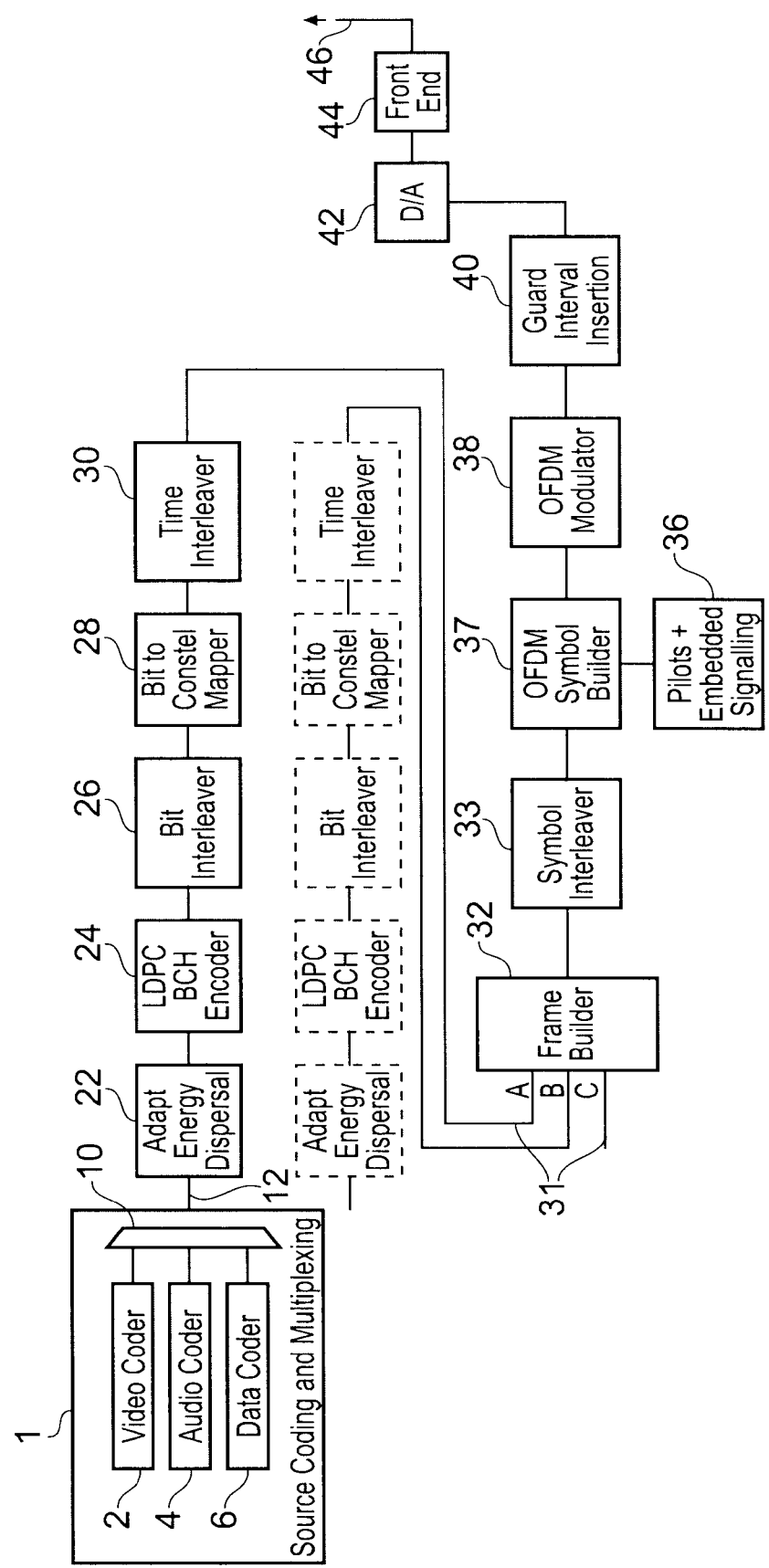
FIG. 1 is a schematic block diagram of an OFDM transmitter which may be used, for example, with the DVB-T2 standard.

FIG. 1 provides an example block diagram of an OFDM transmitter which may be used for example to transmit video images and audio signals in accordance with the DVB-T, DVB-H, DVB-T2 or DVB-C2 standard. In FIG. 1 a program source generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 an OFDM transmitter 20 receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B etc in FIG. 1, via other channels 31. The frame builder 32 then forms many data cells into sequences to be conveyed on OFDM symbols, where an OFDM symbol comprises a number of data cells, each data cell being mapped onto one of the sub-carriers. The number of sub-carriers will depend on the mode of operation of the system, which may include one of 1 k, 2 k, 4 k, 8 k, 16 k or 32 k, each of which provides a different number of sub-carriers according, for example to the following table:

| Mode | Maximum Number of Sub-carriers per mode. Data Sub-carriers |
|------|------|
| 1K | 853 |
| 2K | 1705 |
| 4K | 3409 |
| 8K | 6913 |
| 16K | 13921 |
| 32K | 27841 |

The sequence of data cells to be carried in each OFDM symbol is then passed to the symbol interleaver 33. The OFDM symbol is then generated by an OFDM symbol builder block 37 which introduces pilot and synchronising signals fed from a pilot and embedded signal former 36. An OFDM modulator 38 then forms the OFDM symbol in the time domain which is fed to a guard insertion processor 40 for generating a guard interval between symbols, and then to a digital to analogue convertor 42 and finally to an RF amplifier within an RF front end 44 for eventual broadcast by the COFDM transmitter from an antenna 46.

Frame Format

Figure 2:
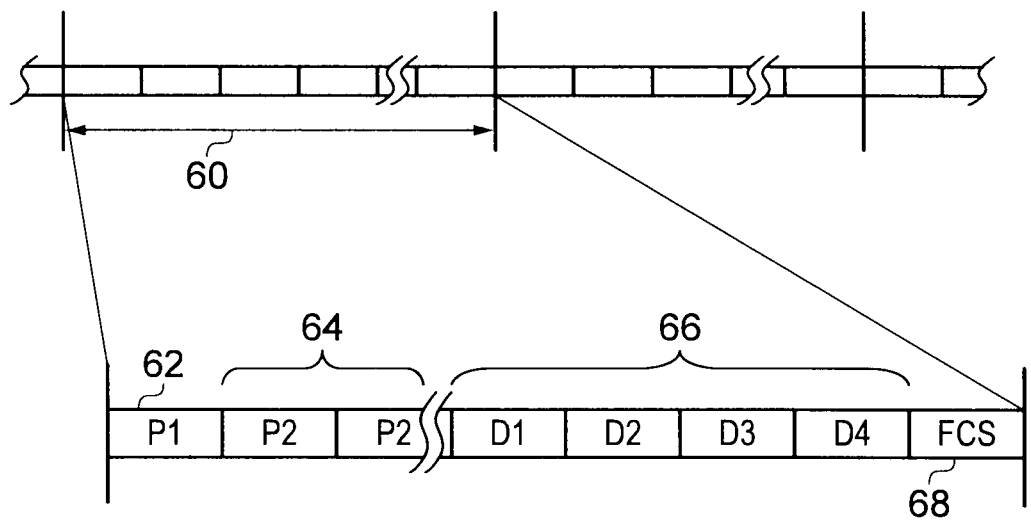
FIG. 2 is an example illustration of a super frame structure according to the DVB-T2 standard.

For the DVB-T2 system, the number of sub-carriers per OFDM symbol can vary depending upon the number of pilot and other reserved carriers. An example illustration of a "super frame" according to the DVB-T2 standard is shown in FIG. 2.

Thus, in DVB-T2, unlike in DVB-T, the number of sub-carriers for carrying data is not fixed. Broadcasters can select one of the operating modes from 1 k, 2 k, 4 k, 8 k, 16 k, 32 k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with a preamble or P1 symbol as shown in FIG. 2, which provides signalling information relating to the configuration of the DVB-T2 deployment, including an indication of the mode. The P1 symbol is followed by one or more P2 OFDM symbols 64, which are then followed by a number of payload carrying OFDM symbols 66. The end of the physical layer frame is marked by a frame closing symbols (FCS) 68. For each operating mode, the number of sub-carriers may be different for each type of symbol. Furthermore, the number of sub-carriers may vary for each according to whether bandwidth extension is selected, whether tone reservation is enabled and according to which pilot sub-carrier pattern has been selected. As such a generalisation to a specific number of sub-carriers per OFDM symbol is difficult.

Receiver

Figure 3:
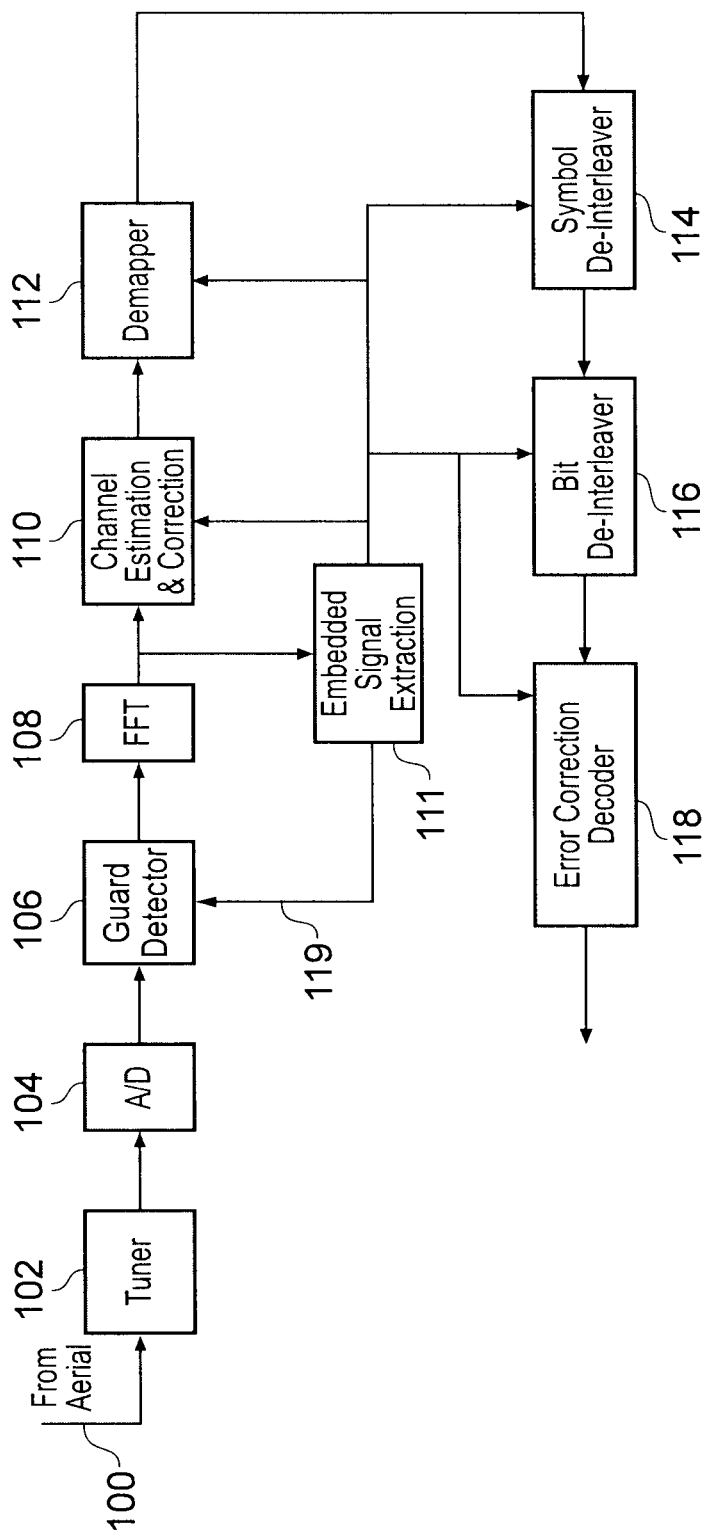
FIG. 3 is a schematic block diagram of an OFDM receiver which may be used, for example, with the DVB-T or DVB-T2 standard.

FIG. 3 provides an example illustration of a receiver which may be used with the present technique. As shown in FIG. 3, an OFDM signal is received by an antenna 100 and detected by a tuner 102 and converted into digital form by an analogue-to-digital converter 104. A guard interval removal processor 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to a symbol de-interleaver 114, which operates to effect a reverse mapping of the received data symbol to re-generate an output data stream with the data de-interleaved. Similarly, the bit de-interleaver 116 reverses the bit interleaving performed by the bit interleaver 26. The remaining parts of the OFDM receiver shown in FIG. 3 are provided to effect error correction decoding 118 to correct errors and recover an estimate of the source data.

As shown in FIG. 3, the embedded-signalling decoding unit provides, via a connecting channel 119, a control signal. According to the present technique the control signal indicates the guard interval which has been detected from signalling data provided with the OFDM symbols as explained in the following paragraphs. However, advantageously the guard detector 106 also performs a blind detection process for detecting the guard interval without the signalling data, which may be used separately or in combination to determine the guard interval.

Blind Guard Interval Detection

A simplified and yet robust algorithm has been developed to detect blindly a selected guard interval of received OFDM symbols. As will be appreciated, the present technique finds application in detecting the guard interval of OFDM symbols for any system and is not limited to DVB-T2. However motivation for the use of a blind detection arrangement for detecting the length of the guard period has been encouraged by the development of the DVB-T2 specification. This development included modifications to extend the number of guard intervals, from a set of guard intervals which were provided in the DVB-T standard ('old' guard intervals) and an extended set of guard intervals ('new' guard intervals). The guard intervals are signaled to the receiver in L1 signaling data to inform the receiver of the use of 'old' or 'new' guards as defined below.

Signaling Format for the Guard Interval

| Classification | Value | Guard Interval Fraction |
|---|---|---|
| 'Old' Guards | 000 | 1/32 |
| | 001 | 1/16 |
| | 010 | 1/8 |
| | 011 | 1/4 |
| 'New' Guards | 100 | 1/128 |
| | 101 | 19/128 |
| | 110 | 19/256 |
| | 111 | reserved future use |

Figure 4:
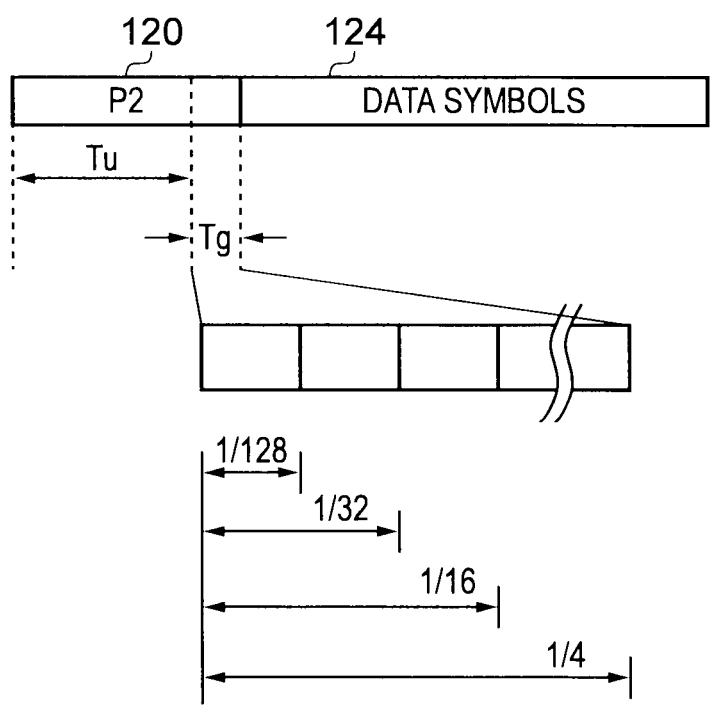
FIG. 4 is a schematic representation illustrating example guard bands for OFDM symbols according to the DVB T2 standard.

FIG. 4 provides an illustrative representation of a P2 symbol which may include various possible guard intervals according to the table shown above. As shown in FIG. 4 a P2 Symbol 120 may be followed by further data symbols 124. The P2 symbol is made up of a first useful part Tu and a guard interval Tg, which includes signal samples repeated from the useful part of the burst Tu.

FIG. 4 illustrates the guard interval detection process inside the DVB-T2 receiver. Initially, a P1 symbol is detected and validated by the receiver. Decoding the P1 symbol provides signaling data which indicates the FFT size. For 16 k and 32 k FFT sizes, it should be possible to demodulate the P2 symbols to obtain the corresponding guard interval mode, before the blind guard detection process can determine the guard interval. However, the proposed blind guard interval detection (GID) is a generic scheme, which can be used to detect guard intervals for all possible FFT sizes if that proved to be advantageous. The output of the blind GID provides a 'detected' GF, which is then used to demodulate and decode the P2 symbols to get the guard interval information. The fine frequency offset information that can be provided by the P1 symbols detection can now be replaced. The proposed blind guard interval detection is capable of providing this information more accurately, because there is no need for up scaling for FFT sizes above 1K.

In exceptional circumstances where the 'decoded' and 'detected' guard intervals would not agree, the decided guard interval would favour the 'decoded' value.

The blind GID should perform accurately. Otherwise, the L1 decoding would suffer a breakdown and a loop needed to be repeated with a fresh set of samples. The information extracted in the current T2 frame can only be used in the next T2 frame. Therefore, we should be able to repeat the loop for a number of times and only through simulations we would be able to establish what this number might be.

As illustrated in FIG. 4 the guard interval Tg could be one of seven possible values as indicated in the above table. Thus the present technique is arranged to detect the correct guard interval before and without recovering the L1 signal information which explicitly identifies the size of the guard interval from the value of the signalling field as represented in the table above. Accordingly, because the guard interval can be detected without detecting each of the P2 symbols and performing the necessary processing and decoding operations in order to recover the signal information, the detection of the guard interval and correspondingly the recovery of data from the OFDM symbol stream can be reduced.

Figure 5:
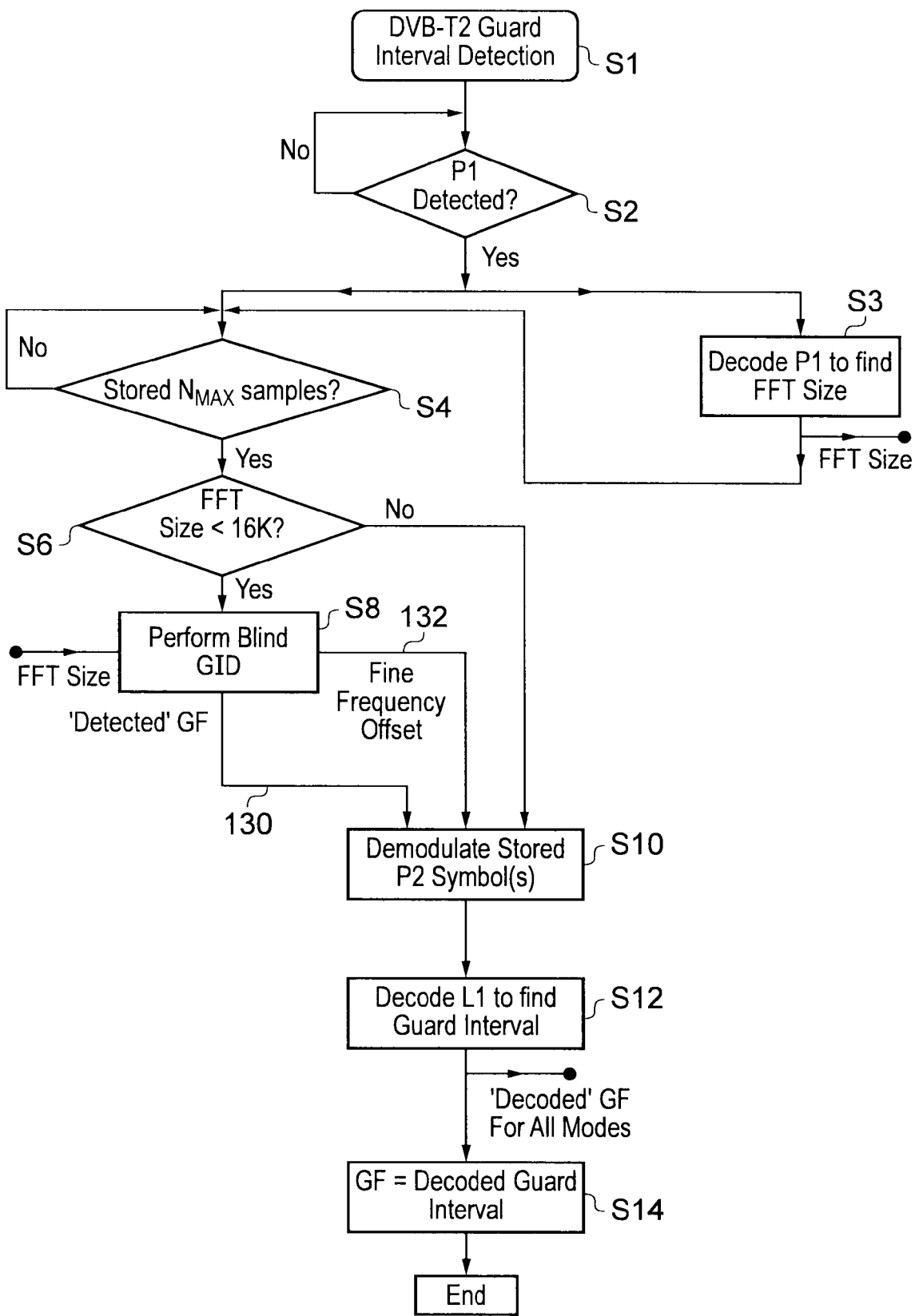
FIG. 5 is a flow diagram illustrating a process according to the present technique for recovering signal information within the DVB T2 standard to identify a guard interval being used or to detect the guard interval without the signalling data (blind detection)

The guard detector 106 and the embedded signalling decoder 111 operating in accordance with the present technique to detect the guard interval will be explained in the following paragraphs. Essentially, FIG. 5 summarises a process wherein a receiver detects both the P1 symbol within the super frame of the DVB T2 system and subsequently detects and demodulates the P2 symbol in order to recover the guard interval from the L1 signal information and performs the blind GID. FIG. 5 is briefly summarised as follows:

S1: The process begins with an initialisation in which the P1 symbol of the OFDM super frame is first detected.

S2: The receiver determines whether or not the P1 symbol has been detected. If yes, then processing proceeds in parallel with steps S3 and S4.

S3: The receiver then decodes the P1 symbol to identify the FFT size which is provided within that symbol.

S4: At decision point S4 the receiver determines whether Nmax samples have been stored, Nmax being equal to the maximum number of valid samples within the OFDM symbols. If Nmax samples have been stored the processing proceeds to step S6.

S6: At decision point S6 it is determined whether or not the FFT size of the OFDM symbol is less than 16K. If the FFT size is less than 16K then according to the present technique a time taken to acquire the guard interval using the blind technique which will be explained in the following paragraphs has been determined to be less than the time taken to acquire all of the P2 symbols and to decode and identify the guard interval from the L1 signalling held within the P2 symbol. Accordingly, if the FFT size is less than 16 k then the processing proceeds to step S8.

S8: Without the FFT size determined and step S3, the guard interval is detected using the blind technique, which will be explained in the following paragraphs. An output of step S8 is to provide a detected guard interval on an output 130 and on second output 132 a fine frequency off set, which, as will be explained in the following paragraphs, is required to correctly detect the received OFDM symbols.

S10: If on the other hand the FFT size is greater than 16K, i.e. 16 k or 32 k for DVB-T2, then processing proceeds to demodulate the stored P2 symbols.

As already explained the number of P2 symbols will vary depending on the mode of operation or in other words the FFT size concerned. Therefore, in order to recover the actual guard interval concerned, which can be identified by recovering the L1 signalling data, steps S12 and S14 are performed. These steps are also performed, when the guard interval is detected blind, so that a confirmation can be made as to the correct guard interval. If there is a discrepancy between the bind detected guard interval and that identified by the L1 signalling data then the guard interval identified by the L1 signalling data is used to determine the guard interval.

S12: At step S12 the L1 data is recovered from the P2 symbols and is decoded to find the guard interval. Thus and output of step S12 is to provide the decoded GF data for all models.

S14: The GF data identifies the decoded guard interval which is to be used to decode the received OFDM symbols.

As will be explained in the following paragraphs the present technique provides an arrangement for detecting the guard interval without detecting and demodulating the P2 signals to recover the L1 data from which the guard interval can be detected. As explained above, for certain modes, for example, for modes less than the 16 k mode, the guard interval can be detected more quickly using the blind detection technique, rather than waiting for all of the P2 data and then decoding the L1 signalling data. Performance results which identify this conclusion will also be explained.

Blind Guard Interval Detection

The P1 detection would signal the start position of a first P2 symbol. Knowing the FFT size, we would 'roughly' locate the end position of the first P2 symbol. Performing a conventional windowed correlation only around this point should be sufficient to flag up the end position and thus make available the guard interval information. The accuracy and reliability of the extracted information is increased by performing the same process over a number of OFDM symbols and accumulating the complex correlation results.

Figure 6:
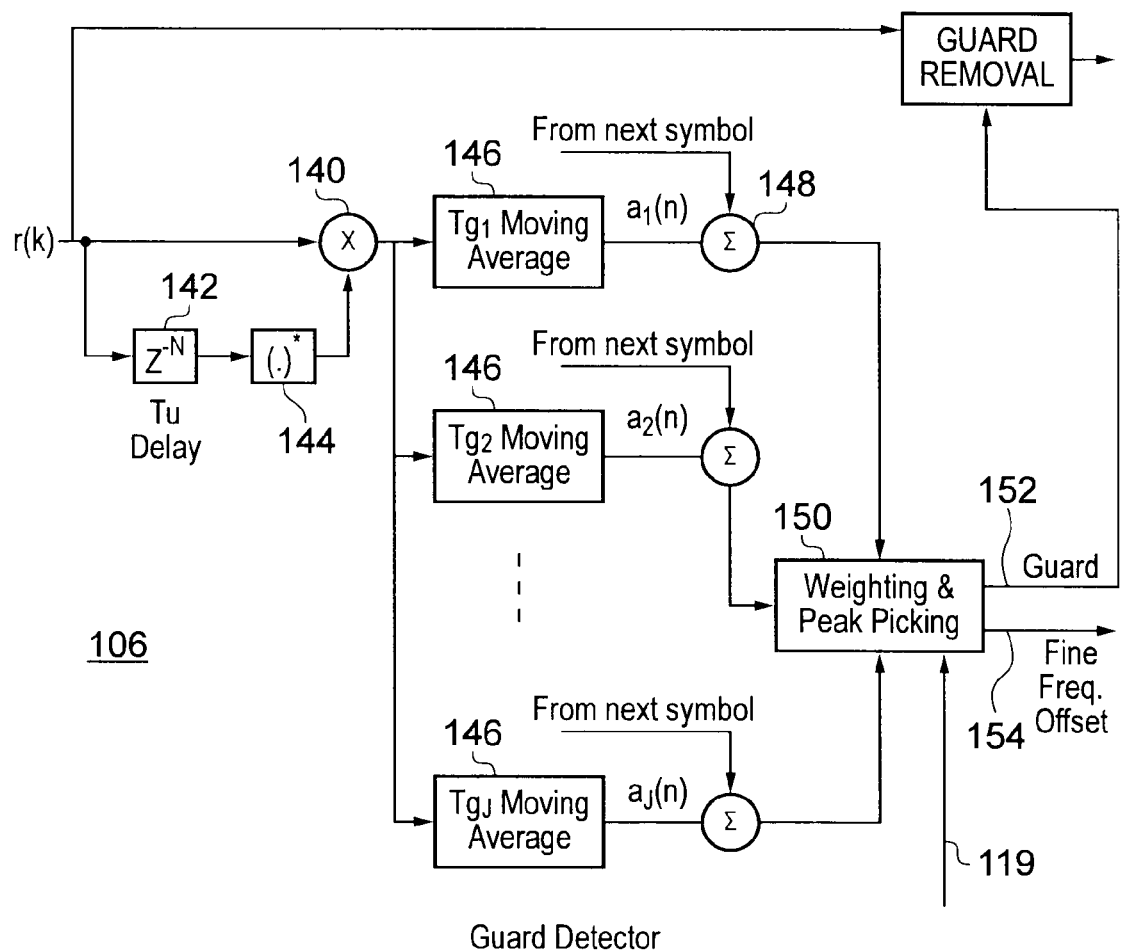
FIG. 6 is a schematic block diagram illustrating a detector for identifying a guard interval of symbol according to the DVB T2 standard without recovering signalling information (blind guard detector)

A schematic blocked diagram illustrating the technique performed by the guard detector 106 for blind detection of the guard interval is provided in FIG. 6, which provides an example of the process performed in step S8 in FIG. 5. FIG. 6 is supported with pictorial illustrations in FIGS. 7a, 7b, 8a and 8b. In FIG. 6 the received OFDM symbol signal samples (K) are fed to a first input of a multiplier 140. A second input of the multiplier 140 receives the signal samples which have been delayed by a value of N-samples which corresponds to the time delay Tu of the temporal period correspondent to the useful part of the OFDM symbol. Thus a delay element 142 delays the signal by N-samples, which corresponds to Tu. The phase of the signal samples from the output of the delay element 142 are then conjugated by an element 144 before being multiplied by the multiplier 140 to form a correlation sample before these correlation samples are summed by a moving averaging filter to form a correlation sum.

A summation process to effect the correlation is made by one of J possible moving average filters each of which corresponds to one of the possible guard intervals Tg. Thus each of the moving averaging filters 146 serves to perform a moving averaging window corresponding to one of the possible guard interval periods Tg. Furthermore, the output of the moving averaging filter is then added to the moving averaging filter results from the next consecutive OFDM symbol using a summing element 148. An output of the summing elements 148 are fed to a guard interval identifier 150 which serves to receive the output from the summing circuits 148 to identify a peak value of one of the output correlation values from the moving averaging filters corresponding to each of the possible guard intervals Tg. The output of the guard interval identifier 150 therefore provides on one output the detected guard interval 152 and on another output the fined frequency offset 154, is generated by an argument of the correlation value, which corresponds to the detected guard interval.

The guard interval identifier 150 also receives on the channel 119, an indication of the guard interval from the L1 signalling data, which is recovered from the embedded-signalling decoding unit 111. This indication of the guard interval may be received before the guard interval can be determined from the correlation output values, depending on the operating mode.

The detected guard interval is received from the channel 152 by a guard remover 153, which removes the guard period samples from the received OFDM symbols to provide the useful samples of the OFDM symbols on an output channel 155 to the FFT processor 108 as shown in FIG. 3.

Returning to the explanation of the blind GID, given that the FFT size is known, for every possible guard interval (J=4 for 'old' guards and J=3 for 'new' guards), a single windowed correlation is performed per symbol for a defined number of symbols {1 ... N}, where N=5 in the example shown in FIGS. 7a and 8a. The 'N' values are weighted and summed together. This means for 'J' possible guard interval, there should be 'J' values computed. As FIG. 9 shows, with J=4 and N=2, the peak value corresponds to the actual guard interval.

The basic principle should now be clear. For the very first symbol, the windowed correlation for all guards would detect some amount of correlation but as the 'fingers' advance by the possible 'Tsi', the correlation reduces except for when the possible 'Ts' equals the actual 'Ts'. In this case, the correlation should remain more or less constant for all 'N' symbols (as shown in FIG. 5)). Thus, when all 'N' values are summed together and weighted accordingly, the actual guard interval would correspond to a maximum 'accumulated correlation magnitude' value. The fine frequency offset can also be measured by computing the argument of the corresponding correlation value.

Numerous simulations were run to select an optimum value for 'N'. There are 6 possible FFT sizes when including 16K and 32K in the blind search. This results in the possible guard interval durations encompassing a rather wide range. In 'clear' channels 'N' can be as low as 2 symbols but when considering more difficult channels this number might need to be increased to 3.

Figure 7A:
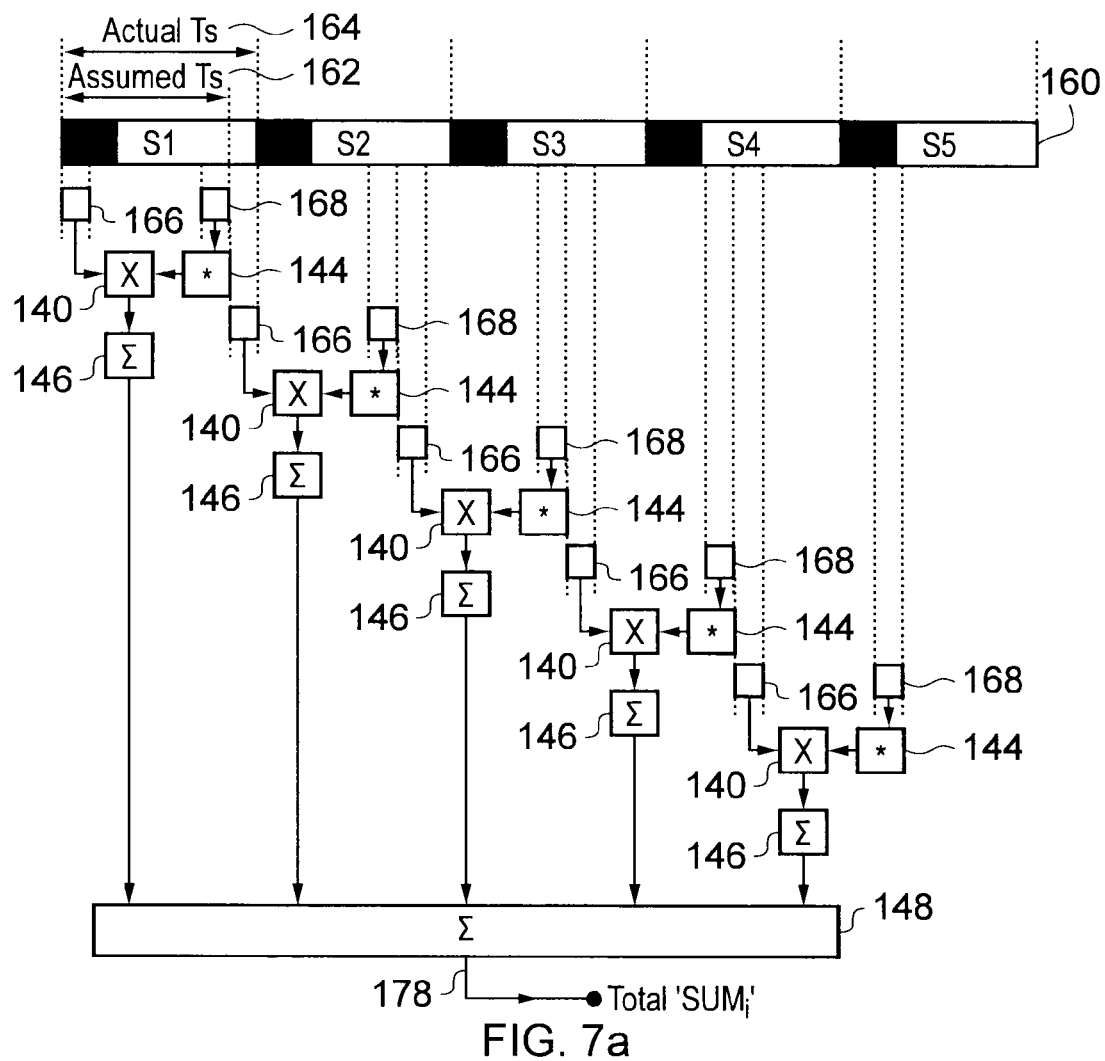
FIG. 7a is a schematic representation of a correlator for detecting a guard interval when the assumed spacing between OFDM symbols and the guard interval does not equal the actual spacing between OFDM symbols and guard interval.
Figure 7B:
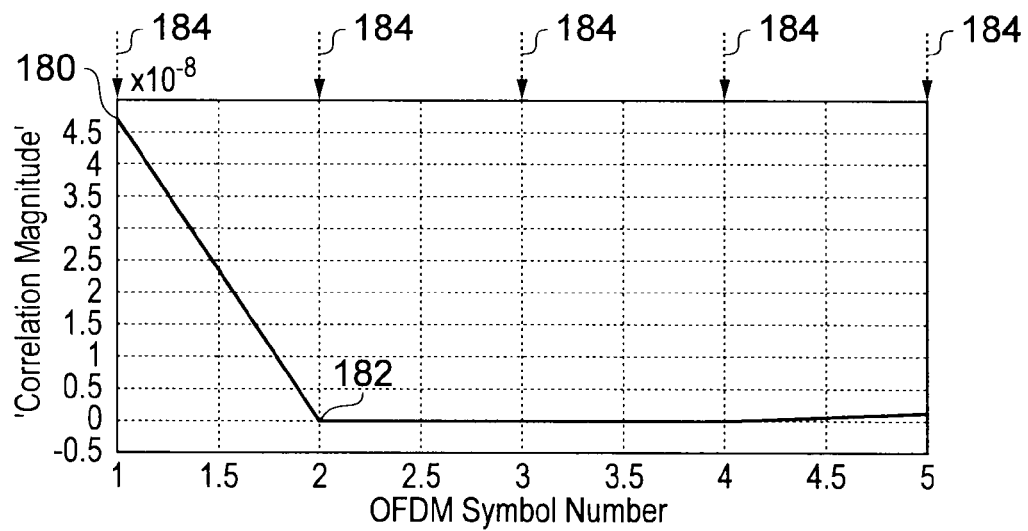

A pictorial representation of the effect of the correlation when the assumed guard interval is not equal to the actual guard interval is represented in FIGS. 7a and 7b. FIG. 7b provides a schematic block diagram illustrating the correlation process which is performed by the circuit shown in FIG. 6. However, elements have been expanded in order to illustrate the effect of the output of the moving averaging filter when the guard interval Tg is not equal to the actual guard interval. As shown in FIG. 7a, a plurality of received OFDM symbols are fed to the correlator 142, 144, 140, which correlates the signal samples which are separated by an assumed value Ts whereas in fact the actual value of Ts is shown 162. The output of the correlation formed by registers 166, 168, and the multiplier 140 and complex conjugator 144 are fed to a summing unit 146 which is then fed to the moving averaging filter formed by summing unit 148. An output of the moving averaging filter 146 is formed at an output 178. FIG. 7b shows a plot of the correlation magnitude at the output 178 with respect to the number of OFDM symbols received.

As can be seen from FIGS. 7a and 7b, when the assumed value of the guard is such that the correlation separation Ts is not equal to the actual separation, the correlation magnitude starts from a high point 180 but proceeds downwards to a noise level value 182 for all substance symbols. Effectively, this is formed because of the negative reinforcement that each of the correlation values for subsequent symbols will not reinforce the signal samples, a part of which will be correctly correlating with samples repeated from the useful part of the burst within the guard interval, but the remainder of which will not be correlated because these are not aligned with the samples from the guard interval. Accordingly, this negative reinforcement effectively causes the moving averaging filter 148 to increasingly produce a noise like output as represented by FIG. 7b.

Figure 8A:
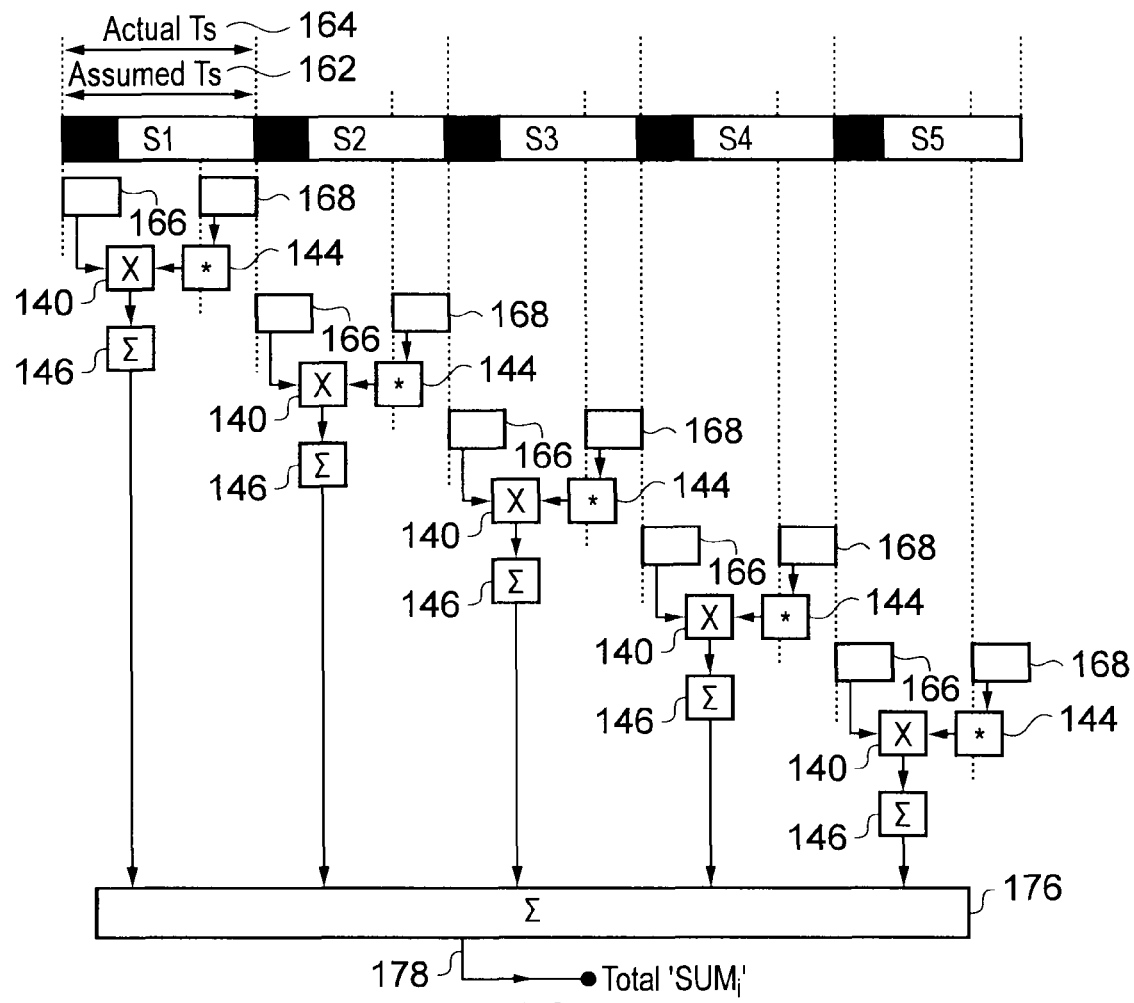
FIG. 8a is a schematic block diagram of the operation of the correlator for detecting the guard interval when the assumed separation between the OFDM symbols is equal to the actual separation between OFDM symbols and the guard interval is correct.
Figure 8B:
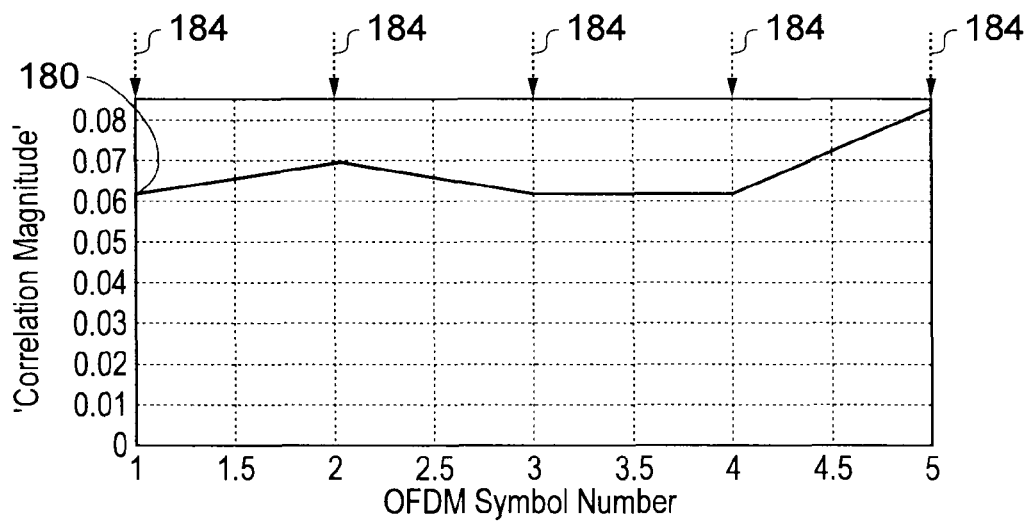

FIGS. 8a and 8b provides a corresponding example to that shown in FIGS. 7a and 7b but for the case where the assumed value of the separation between the signal samples Ts is equal to the actual separation, in other words, the guard interval Tg assumed for the moving averaging filter is the same as the actual guard interval in the received signal samples. Parts shown in FIG. 8a corresponds with the parts shown in FIG. 7b and so these will not be further explained. FIG. 8b corresponds to FIG. 7b. However, as can be seen from FIG. 8b the result of the correlation value at the output of the moving average filter 146 is to start from a highpoint of 180 but to increase or at least provide a constant output from the moving averaging filter as the number of OFDM symbols are received. This is because the correlation of the sample with the guard interval and the useful part of the burst now coincide with the more OFDM symbols are received the more the correlation result is reinforced so therefore each of the OFDM symbols received as indicated by the arrows 184 the correlation result provided at the output of the moving averaging filter 178 is reinforced.

FIG. 9 provides some example results for correlating for possible guard intervals with respect to correlation magnitude. Once the correlation process over two OFDM symbol completes, both the maximum and the 'next maximum' correlation magnitudes are computed. The correlation process would then continue for an extra OFDM symbol if the ratio of 'max' to 'next max' falls below a value which can be adjusted by a user controlled register. Simulations have shown that this remedy increases the detection reliability considerably in multipath channels and in channels with high levels of CWI or noise. As can be seen the actual correlation magnitudes for guard interval number 2 is a "clear winner" with the correlation magnitude of 0.25 compared to the next noise value of 0.06.

FIGS. 10a and 10b illustrate corresponding results for the example shown in FIG. 9 where the maximum correlation value exceeds a designed threshold of 0.15, for example. For the example, shown in FIG. 10a the next maximum value is below the example threshold of 0.15 whereas in 10b the next correlation magnitude is 0.2 which is above the correlation threshold 0.15.

Simplified Architecture

Figure 11:
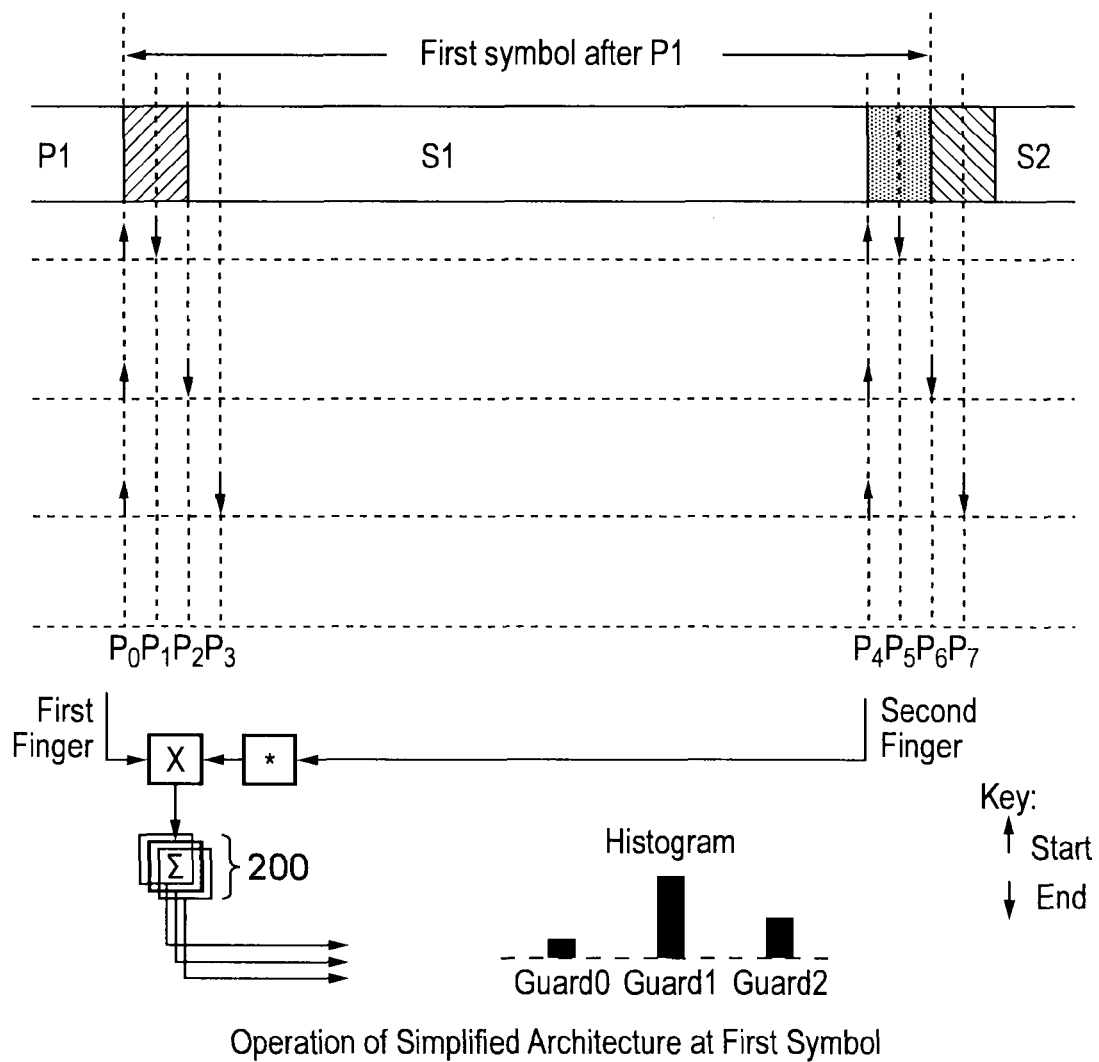
FIG. 11 is an example representation of a simplified architecture for detecting a guard interval according to the present technique.
Figure 12:
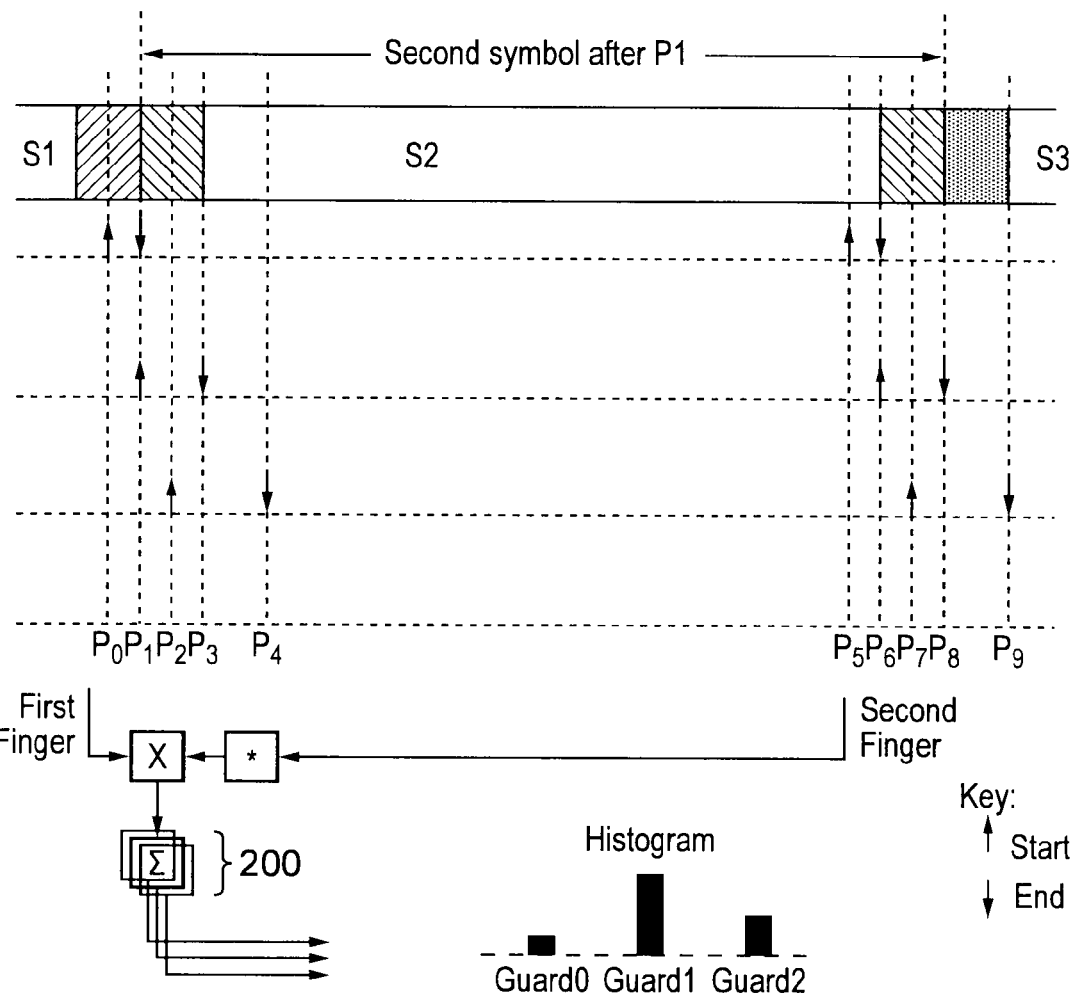
FIG. 12 is a further illustration of an operation of the simplified architecture shown in FIG. 11 for a subsequent second symbol.

Further modifications of the algorithm were made to reduce hardware complexity. FIGS. 11 and 12 provide a simplified representation illustrating the operation of the correlator shown in FIG. 6. As for the example shown in FIGS. 7a and 8a, a correlation is performed from a separation of signal samples corresponding to the value of Tu, that is the number of useful signal samples in the OFDM symbols. However, for each of the possible guard intervals a different summation is performed as represented by a multiple summing unit through which possible guard values are included 200. Thus FIG. 11 shows the output for a first symbol after the P1 symbol and FIG. 12 provides the example of the second symbol after the P1 symbol.

A single 'windowed correlator' is used for all guards (maximum of four guards at a time). The two 'fingers' of the correlator are separated by the FFT size and the output of the correlation is directed into a number of adders (maximum of four) at different times. Let us describe the process in the first symbol after P1 symbol by examining FIG. 11, where a 'triguard possibility' is considered. For this symbol, the first locations of the 'first finger' and the 'second finger' are the same, $P_0$ and $P_4$ respectively, for all possible guards. Therefore, the correlation is turned on at $P_0$ and the correlation values are summed together. Once the first finger reaches $P_1$, the sum value is stored away, $SUM_0$, and the correlation continues without resetting the sum value. At $P_2$ and $P_3$, the same process is repeated and the other two sums generated, $SUM_1$ and $SUM_2$. The sum value is now reset ready for the next symbol. The correlation can now be switched off until the first finger reaches the next $P_0$ i.e. second symbol. As shown in FIG. 12, the first location of the two 'fingers' at this symbol might now be different. In this example, the correlation values between $P_0$ and $P_1$ are summed together to form $SUM_0$, values between $P_1$ and $P_3$ are summed together to form $SUM_1$ and values between $P_2$ and $P_4$ are summed together to form $SUM_2$.

Before computing the 'correlation magnitude', some appropriate weighting needed to be applied to the generated SUM values. This is because, the correlation windows are not the same and the computed maximum can be misleading. The weighting is a simple mechanism in which the SUM values corresponding to smaller windows are scaled up accordingly. The weighting mechanism can also be reversed. This is to scale down SUM values corresponding to larger windows. This is an implementation decision as one requires a 'multiplication' and the other a 'division' operation.

As can be seen from FIG. 12 after the first symbol, the signal samples for guard zero and guard two are no longer aligned with the signal samples correlated from a useful part of the OFDM burst. Accordingly, the output value of the correlation is not reinforced. In contrast the guard correlation value for guard one is reinforced.

As illustrated in FIGS. 11 and 12 the start value for the correlation as shown by an upwardly pointing arrow and the stop value is represented by a downwardly pointing arrow.

The guard interval detection process as illustrated by the above example is dependent on the accuracy of the P1 symbol detection algorithm. The end of P1 symbol is required to be detected accurately and large 'P1 position errors' could lead to significant loss of performance. The present examples have been optimized to tolerate P1 position errors of up to a +/− (half the actual guard), as shown in FIG. 13.

Figure 13:
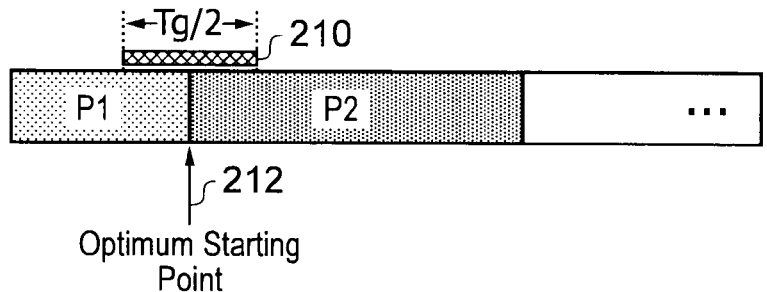
FIG. 13 is an illustration of an optimum starting point for detecting a guard interval.

FIG. 13 provides and example illustration of the process starting the correlation with respect to the possible value of the guard interval. As shown in FIG. 13 there is a possible range of starting points over a value of the guard interval Tg/2 as represented by a block 210. Thus, after detecting the P1 symbol the next possible starting point can vary over a range of positions as illustrated by Tg/2. However, an optimum starting point 212 is shown. There are various techniques for identifying the possible staring point for performing in correlation from the P1 symbol. As those acquainted with the DVB-T2 standards will appreciate, the P1 symbol is a robustly encoded OFDM symbol with two guard intervals as a preamble and a post-amble from the useful part of the burst. Accordingly, but with correlating the pre-amble and the post-amble with a useful part of the symbols, there is a greater likelihood of detecting the FFT size and also an optimised starting point 212.

In our co-pending patent application number GB0909590.2 a scheme for detecting the P1 symbol is disclosed, which offers high reliability with a reduced position error range. The contents of our co-pending UK patent application number GB0909590.2 are incorporated herein by reference and in particular the technique for detecting the P1 symbols as disclosed therein. This is well within the tolerance of the guard interval detection design. The Guard interval detection technique can therefore used in combination with the P1 symbol detection technique to provide an improved reliability of detecting and recovering data from the OFDM symbols.

Results: Acquisition Time

A table below provides a summary of different configurations and corresponding acquisition times for all FFT modes in an 8 MHz system. In general, a maximum acquisition time, Acq, can be computed using Equations (1) and (2), where 'N' represents the number of OFDM symbols and 'T' is the elementary period as given in Table (3). For FFT modes 1 k to 16K, the maximum guard size is ¼ whereas it is 19/128 for 32 k, hence Equations (1) and (2).

$$Acq=(5/4)*N*FFT\ Size*T;\ for\ 1K\ to\ 16K\ FFT \quad (1)$$

$$Acq=(147/128)*N*FFT\ Size*T;\ for\ 32K\ FFT \quad (2)$$

| FFT Size | N = 2 Minimum Acquisition Time (msec) | N = 3 Maximum Acquisition Time (msec) |
| --- | --- | --- |
| 1K | 0.28 | 0.42 |
| 2K | 0.56 | 0.84 |
| 4K | 1.12 | 1.68 |
| 8K | 2.24 | 3.36 |
| 16K | 4.48 | 6.72 |
| 32K | 8.232 | 12.348 |

As indicated by the table above, the acquisition time for the 16K and 32K modes is significant and therefore may be acquired more quickly by detecting decoding the L1 signalling data from the P2 symbols.

Results: Performance Evaluation

Figure 14A:
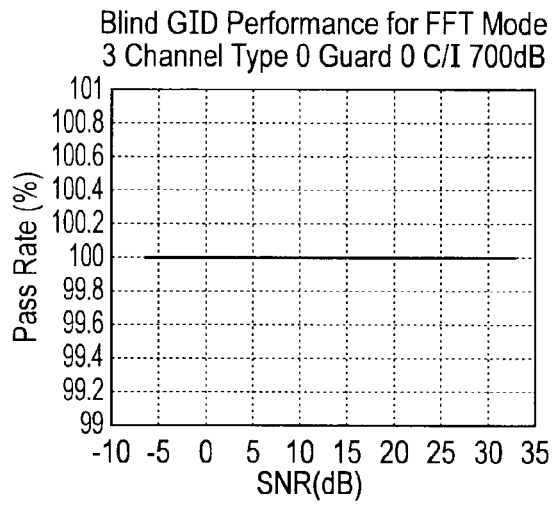
FIG. 14a is a graphical illustration of a performance of correctly identifying a guard interval against additive white Gaussian noise for an FFT size of 8 k and a one path channel with a guard interval of 1/32.
Figure 14B:
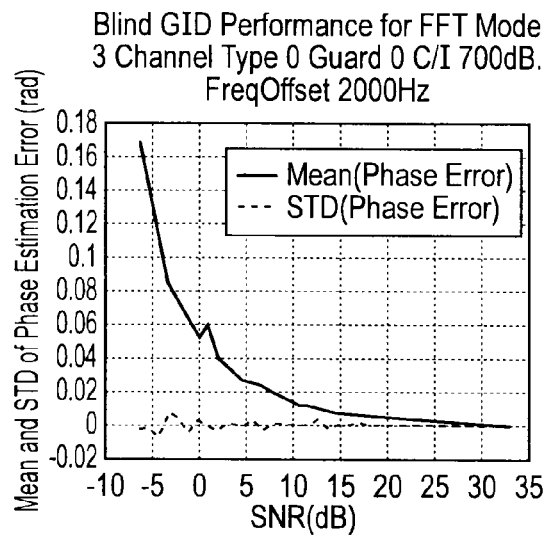
Figure 15A:
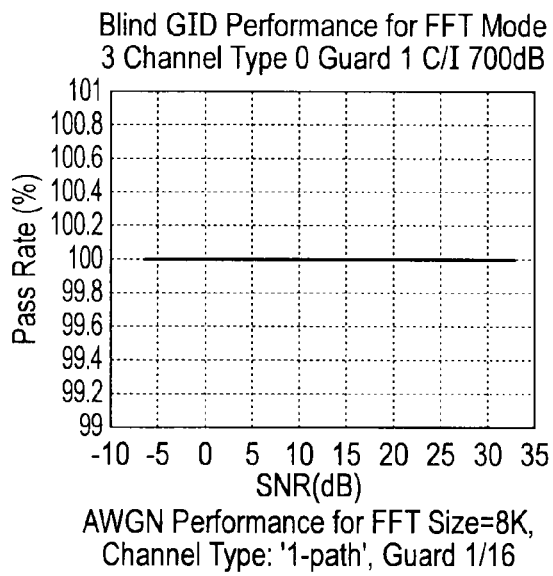
FIG. 15a is a graphical illustration of a performance of correctly identifying a guard interval against additive white Gaussian noise for an FFT size of 8 k and a one path channel with a guard interval of 1/16.
Figure 15B:
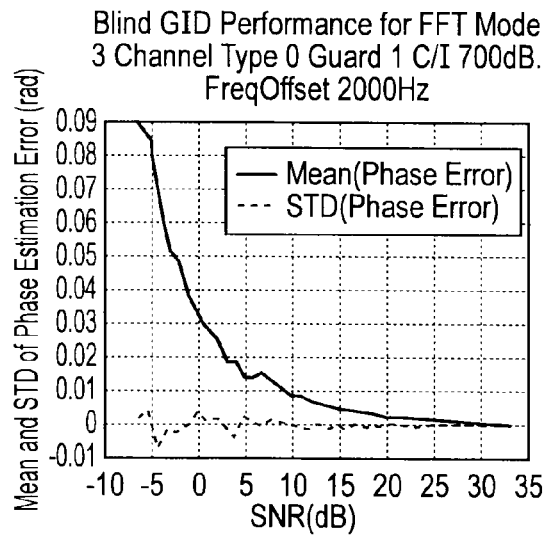

FIGS. 14a, 14b, 15a and 15b illustrate the typical performance of the guard interval detection process described above for the two possible guard interval values of ⅟32 and ⅟16 respectively. As shown in FIGS. 14a and 15a, a pass rate is shown at 100% with respect to the accuracy with which the guard interval is detected using the blind detection technique, as the signal to noise ratio of additive white Gaussian noise increases. As shown in FIGS. 14b and 15b the mean phase error and the standard deviation of the fine frequency offset reduces sharply with respect to signal to noise ratio. As can bee seen, the fine frequency offset error converges to zero for high signal to noise ratios. In general, the proposed scheme shows a very high degree of robustness both against AWGN and CWI (continuous wave interference) in single and multi-path channels. The fine frequency offset estimation accuracy is also high and it might be a better alternative for the value computed at P1 detection block as there is no issue of mapping for FFT sizes above 1 k.

As will be appreciated the transmitter and receiver shown in FIGS. 1 and 3 respectively are provided as illustrations only and are not intended to be limiting. For example, it will be appreciated that the present technique can be applied to a different transmitter and receiver architecture.

As mentioned above, embodiments of the present invention find application with DVB standards such as DVB-T, DVB-T2, DVB-C2 and DVB-H, which are incorporated herein by reference. Services that may be provided may include voice, messaging, internet browsing, radio, still and/or moving video images, television services, interactive services, video or near-video on demand and option. The services might operate in combination with one another. In other examples embodiments of the present invention finds application with the DVB-T2 standard as specified in accordance with ETSI standard "EN 302 755 and ETSI EN 300 755, "Digital Video Broadcasting (DVB): Frame structure, channel coding and modulation for a second generation digital terrestrial television broadcasting system (DVB-T2)", May 2008. In other examples embodiments of the present invention find application with the cable transmission standard known as DVB-C2. For the example of DVB-C2, it will be appreciated that the OFDM symbols are not transmitted and received via a radio frequency carrier, but via cable and so an appropriate adaptation of the transmitter and receiver architecture can be made. However, it will be appreciated that the present invention is not limited to application with DVB and may be extended to other standards for transmission or reception, both fixed and mobile.

The invention claimed is:

1. A receiver detects and recovers data from received Orthogonal Frequency Division Multiplexed (OFDM) symbols, the OFDM symbols including a plurality of sub-carrier symbols formed in the frequency domain and transformed into the time domain for transmission, the time domain OFDM symbols including a guard interval, the guard interval being one of a plurality of predetermined temporal lengths and formed by repeating time domain samples of the OFDM symbols from a useful part of the OFDM symbols for a first period corresponding to the guard interval, the receiver comprising:

a demodulator to detect a signal representing the OFDM symbols, and to generate a sampled version of the OFDM symbols in the time domain, a guard detector to identify from the time domain samples of the OFDM symbols, useful samples of the OFDM symbols, a Fourier transform processor to receive the time domain version of the OFDM symbols and to perform a Fourier transform on the useful samples of the OFDM symbols to form a frequency domain version of the OFDM symbols, and a detector to recover data from data bearing sub-carriers of the OFDM symbols, wherein the guard detector includes:

a correlator to correlate the time domain samples at a separation determined in accordance with the useful samples of the OFDM symbols (Tu), and for each of a plurality of possible guard intervals (Tg) combining the correlated time domain samples for a second period equal to the guard interval, for a plurality of consecutive OFDM symbols, to form a correlation output value for each of the plurality of possible guard intervals, and a guard interval identifier to receive an output from the correlator and to identify one of the guard intervals used for the received OFDM symbols from the correlation output value for each of the plurality of possible guard intervals, wherein the received OFDM symbols include signalling data indicating the guard interval of the received OFDM symbols, and a number of samples of the useful part of the OFDM symbols varies between a predetermined number of discrete values in accordance with a transmitter operating mode, wherein the detector recovers the signalling data from the OFDM symbols and provides the guard detector with an indication of the guard interval indicated by the signalling data, and wherein the guard interval identifier determines the guard interval from the correlation output value or the signalling data depending on whether the signalling data is available before the guard interval is determined from the correlation output value.

2. A receiver as claimed in claim 1, wherein the correlator includes:

a multiplier to multiply signal samples separated by the useful samples in the OFDM symbols (Tu) one of which is conjugated, and a moving averaging filter for each of the plurality of possible guard intervals (Tg) to form an average of the samples at an output of the multiplier, a number of samples averaged by each moving average filter being equal to the corresponding guard interval, the guard interval identifier identifying the guard interval from the moving averaging filter output correlation value having a greatest value after the consecutive OFDM symbols.

3. A receiver as claimed in claim 1, wherein a number of the plurality of consecutive OFDM symbols is determined in accordance with a time to achieve a minimum level of reliability in the determination of the guard interval.

4. A receiver as claimed in claim 1, wherein a number of the plurality of consecutive OFDM symbols is two.

5. A receiver as claimed in claim 1, wherein the transmitter operating mode includes one of 16K signalling samples and 32K signalling samples, and the guard interval identifier determines the guard interval from the signalling data, if the transmitter operating mode is one of the 16K mode and the 32K mode.

6. A receiver as claimed in claim 1, wherein the guard interval identifier determines a fine frequency offset of the OFDM symbols in the frequency domain by determining an argument of the correlation output value for the identified guard interval, the fine frequency offset being used to detect the data from the OFDM symbols.

7. A method of detecting and recovering data from received Orthogonal Frequency Division Multiplexed (OFDM) symbols, the OFDM symbols including a plurality of sub-carrier symbols formed in the frequency domain and transformed into the time domain for transmission, the time domain OFDM symbols including a guard interval, the guard interval being one of a plurality of predetermined temporal lengths and formed by repeating time domain samples of the OFDM symbols from a useful part of the symbols for a first period corresponding to the guard interval, the method comprising:
  detecting a signal representing the OFDM symbols,
  generating a sampled version of the OFDM symbols in the time domain,
  identifying from the time domain samples of the OFDM symbols, useful samples of the OFDM symbols, by detecting guard interval samples,
  generating a frequency domain version of the OFDM symbols, from which data from data bearing sub-carriers can be recovered, by receiving the time domain version of the OFDM symbols and performing a Fourier transform on the useful samples of the OFDM symbols, and
  recovering the data from the data bearing sub-carriers of the OFDM symbols,
  wherein said identifying from the time domain samples of the OFDM symbols, the useful samples of the OFDM symbols, includes:
  correlating the time domain samples at a separation determined in accordance with the useful samples of the OFDM symbols, and for each of a plurality of possible guard intervals combining the correlated time domain samples for a second period equal to the guard interval, for a plurality of consecutively received OFDM symbols, to form a correlation output value for each of the plurality of possible guard intervals, and
  identifying one of the guard intervals used for the received OFDM symbols from the correlation output value for each of the plurality of possible guard intervals,
  wherein the received OFDM symbols include signalling data indicating the guard interval of the received OFDM symbols, and a number of samples of the useful part of the OFDM symbols varies between a predetermined number of discrete values in accordance with a transmitter operating mode, and
  wherein the method further comprises:
  recovering the signalling data from the OFDM symbols, and
  determining the guard interval from the correlation output or the signalling data depending on whether the signalling data is available before the guard interval is determined from the correlation output value.

8. A method as claimed in claim 7, wherein the correlating includes:
  multiplying the signal samples separated by the useful samples (Tu) in the OFDM symbols one of which is conjugated,
  using a moving averaging filter for each of the plurality of possible guard intervals (Tg) to form an average of the multiplied samples, a number of samples averaged by the moving average filter being equal to the corresponding guard interval, and
  identifying the guard interval from the moving averaging filter output correlation value having a greatest value after the consecutive OFDM symbols.

9. A method as claimed in claim 7, wherein a number of the plurality of consecutively received OFDM symbols is determined in accordance with a time to achieve a minimum level of reliability in the detection of the guard interval samples.

10. A method as claimed in claim 7, wherein a number of the plurality of consecutively received OFDM symbols is two.

11. A method as claimed in claim 7, comprising:
  determining a fine frequency offset of the OFDM symbols in the frequency domain by determining an argument of the correlation output value for the identified guard interval, and using the fine frequency offset to detect the data from the OFDM symbols.

12. A receiver that detects and recovers data from received Orthogonal Frequency Division Multiplexed (OFDM) symbols, the OFDM symbols including a plurality of sub-carrier symbols formed in the frequency domain and transformed into the time domain for transmission, the time domain OFDM symbols including a guard interval, the guard interval being one of a plurality of predetermined temporal lengths and formed by repeating time domain samples of the OFDM symbols for a first period corresponding to the guard interval from the OFDM symbol, the receiver comprising:
  a correlator to multiply time domain samples at a separation determined in accordance with useful samples of the OFDM symbols and for each of a plurality of possible guard intervals summing correlated time domain samples for a second period equal to the guard interval, for a plurality of consecutively received OFDM symbols, to form for each of the plurality of possible guard intervals a correlation output value, and
  a guard interval identifier to receive an output from the correlator and to identify one of the guard intervals used for the received OFDM symbols from the correlation output value for each of the plurality of possible guard intervals,
  wherein the received OFDM symbols include signalling data indicating the guard interval of the received OFDM symbols, and a number of samples of the useful part of the OFDM symbols varies between a predetermined number of discrete values in accordance with a transmitter operating mode, wherein the signalling data is recovered from the OFDM symbols, and an indication of the guard interval indicated by the signalling data is provided to the guard interval identifier, and wherein the guard interval identifier determines the guard interval from the correlation output value or the signalling data depending on whether the signalling data is available before the guard interval is determined from the correlation output value.

13. A guard detector for a DVB receiver, the detector comprising:

a correlator to multiply time domain samples at a separation determined in accordance with the useful samples of received Orthogonal Frequency Division Multiplexed (OFDM) symbols including a guard interval, and for each of a plurality of possible guard intervals summing multiplied time domain samples for a period equal to the guard interval, for a plurality of consecutively received OFDM symbols, to form for each of the plurality of possible guard intervals a correlation output value, and a guard interval identifier to receive an output from the correlator and to identify one of the guard intervals used for the received OFDM symbols from the correlation output value for each of the plurality of possible guard intervals, wherein the received OFDM symbols include signalling data indicating the guard interval of the received OFDM symbols, and a number of samples of a useful part of the OFDM symbols varies between a predetermined number of discrete values in accordance with a transmitter operating mode, wherein the signalling data is recovered from the OFDM symbols, and an indication of the guard interval indicated by the signalling data is provided to the guard interval identifier, and wherein the guard interval identifier determines the guard interval from the correlation output value or the signalling data depending on whether the signalling data is available before the guard interval is determined from the correlation output value.

14. An apparatus that detects and recovers data from received Orthogonal Frequency Division Multiplexed (OFDM) symbols, the OFDM symbols including a plurality of sub-carrier symbols formed in the frequency domain and transformed into the time domain for transmission, the time domain OFDM symbols including a guard interval, the guard interval being one of a plurality of predetermined temporal lengths and formed by repeating time domain samples of the OFDM symbols from a useful part of the OFDM symbols for a first period corresponding to the guard interval, the apparatus comprising:

a processor including:
a detecting unit to detect a signal representing the OFDM symbols,
a first generating unit to generate a sampled version of the OFDM symbols in the time domain,
an identifying unit to identify from the time domain samples of the OFDM symbols, useful samples of the OFDM symbols, by detecting guard interval samples,
a second generating unit to generate a frequency domain version of the OFDM symbols, from which data from data bearing sub-carriers can be recovered, by receiving the time domain version of the OFDM symbols and performing a Fourier transform on the useful samples of the OFDM symbols, and
a recovering unit to recover the data from the data bearing sub-carriers of the OFDM symbols, wherein the identifying unit to identify from the time domain samples of the OFDM symbols, the useful samples of the OFDM symbols, includes:

a correlating unit to correlate the time domain samples at a separation determined in accordance with the useful samples of the OFDM symbols, and for each of the plurality of possible guard intervals combining the correlated time domain samples for a second period equal to the guard interval, for a plurality of consecutively received OFDM symbols, to form a correlation output value for the guard interval, and a guard interval identifying unit to identify one of the guard intervals used for the received OFDM symbols from the correlation output value for each of the plurality of possible guard intervals, wherein the received OFDM symbols include signalling data indicating the guard interval of the received OFDM symbols, and a number of samples of the useful part of the OFDM symbols varies between a predetermined number of discrete values in accordance with a transmitter operating mode, wherein the detecting unit recovers the signalling data from the OFDM symbols and provides the identifying unit with an indication of the guard interval indicated by the signalling data, and wherein the guard interval identifying unit determines the guard interval from the correlation output value or the signalling data depending on whether the signalling data is available before the guard interval is determined from the correlation output value.

15. A receiver that detects and recovers data from received Orthogonal Frequency Division Multiplexed (OFDM) symbols, the receiver comprising:

a demodulator to detect a signal representing the OFDM symbols, and to generate a sampled version of the OFDM symbols in the time domain, the OFDM symbols including a plurality of sub-carrier symbols formed in the frequency domain and transformed into the time domain for transmission, the time domain OFDM symbols including a guard interval, the guard interval being one of a plurality of predetermined temporal lengths and formed by repeating time domain samples of the OFDM symbols from a useful part of the OFDM symbols for a first period corresponding to the guard interval, a guard detector to identify from the time domain samples of the OFDM symbols, useful samples of the OFDM symbols, a Fourier transform processor to receive the time domain version of the OFDM symbols and to perform a Fourier transform on the useful samples of the OFDM symbols to form a frequency domain version of the OFDM symbols, and a detector to recover data from data bearing sub-carriers of the OFDM symbols, wherein the guard detector includes:

a correlator to correlate the time domain samples at a separation determined in accordance with the useful samples of the OFDM symbols (Tu), and for each of a plurality of possible guard intervals (Tg) combining the correlated time domain samples for a second period equal to the guard interval, for a plurality of consecutive OFDM symbols, to form a correlation output value for each of the plurality of possible guard intervals, and a guard interval identifier to receive an output from the correlator and to identify one of the guard intervals used for the received OFDM symbols from the correlation output value for each of the plurality of possible guard intervals, wherein the received OFDM symbols include signalling data indicating the guard interval of the received OFDM symbols, and a number of samples of the useful part of the OFDM symbols varies between a predetermined number of discrete values in accordance with a transmitter operating mode, wherein the detector recovers the signalling data from the OFDM symbols and provides the guard detector with an indication of the guard interval indicated by the signalling data, and wherein the guard interval identifier determines the guard interval from the correlation output value or the signalling data depending upon whether the signalling data is available before the guard interval is determined from the correlation output value.

* * * * *